H. K. HARRIS.
ADVERTISING DEVICE.
APPLICATION FILED FEB. 5, 1914.
1,313,816.
Patented Aug. 19, 1919.
11 SHEETS—SHEET 1.
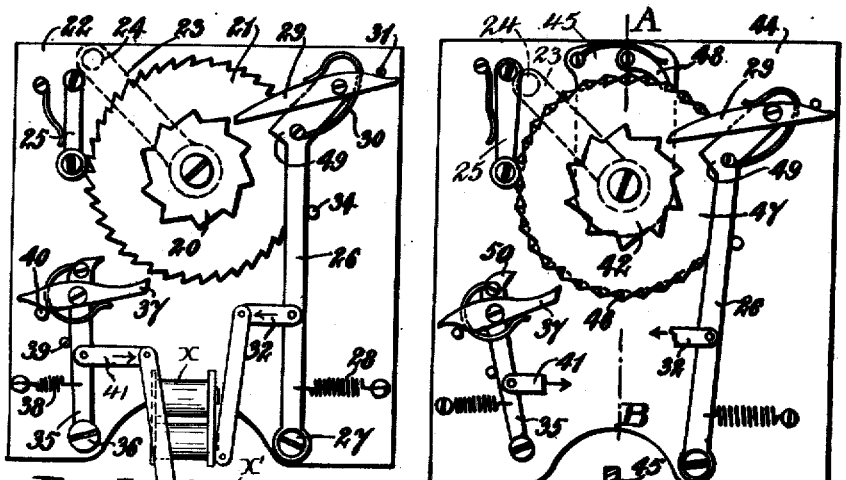
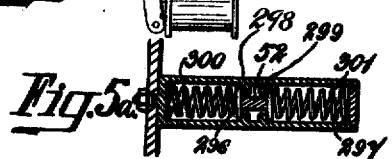
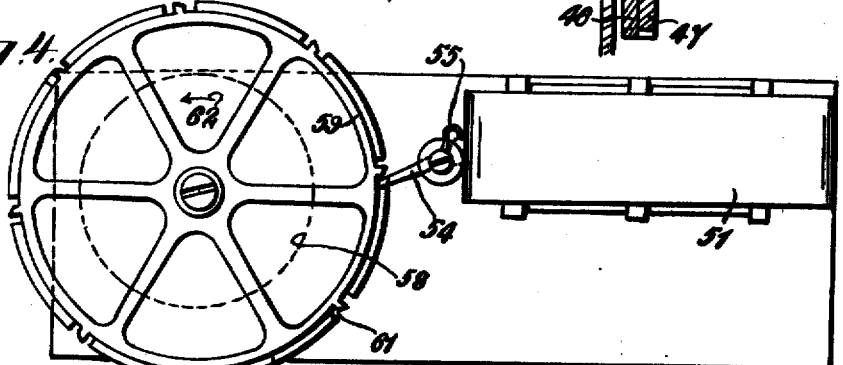
WITNESSES
INVENTOR
HENRY KINGSFORD HARRIS
BY
ATTORNEYS

H. K. HARRIS.
ADVERTISING DEVICE.
APPLICATION FILED FEB. 5, 1914.

1,313,816.

Patented Aug. 19, 1919.
11 SHEETS—SHEET 2.

WITNESSES

INVENTOR
HENRY KINGSFORD HARRIS
BY
ATTORNEYS

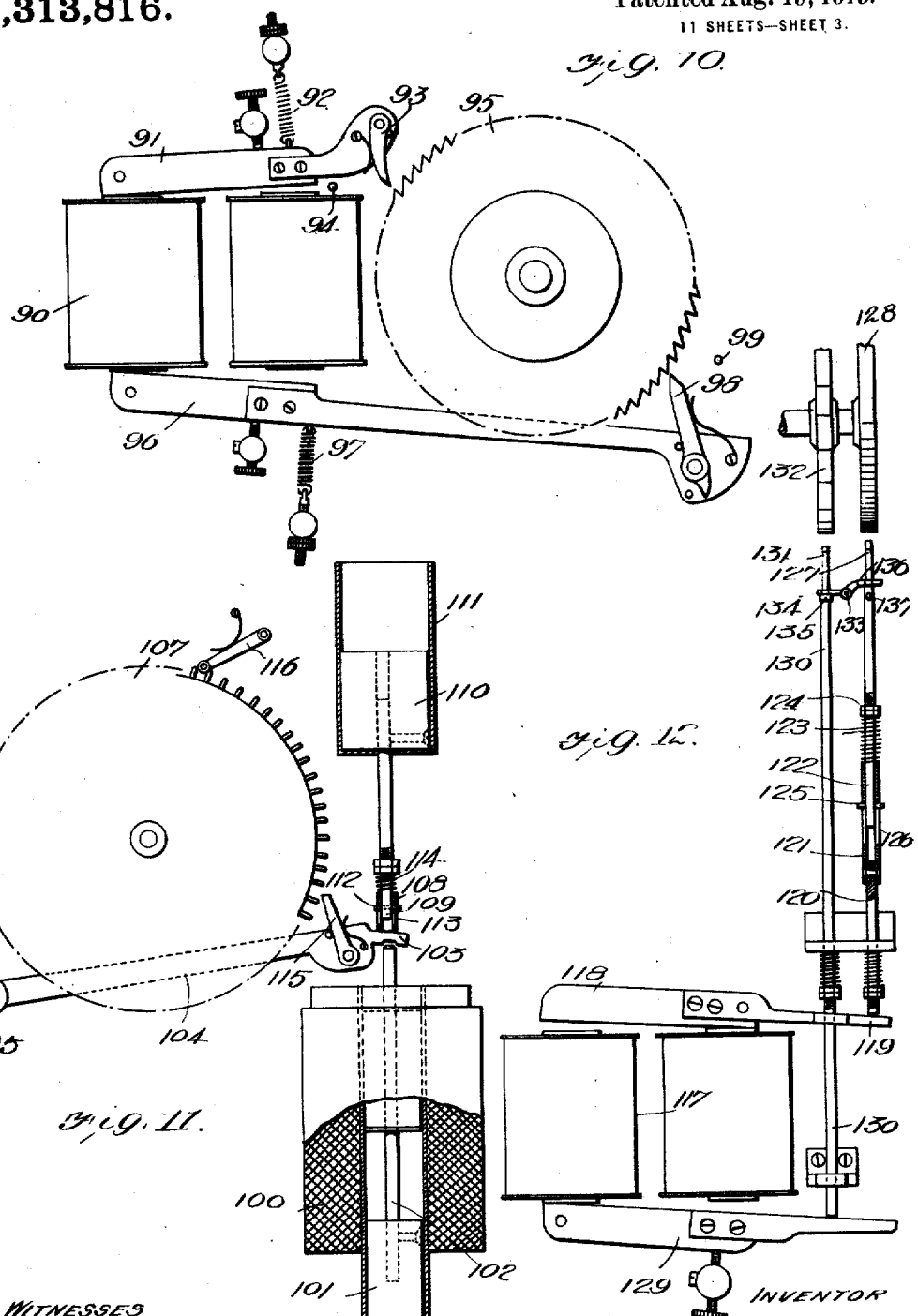

H. K. HARRIS.
ADVERTISING DEVICE.
APPLICATION FILED FEB. 5, 1914.

1,313,816.

Patented Aug. 19, 1919.
11 SHEETS—SHEET 4.

WITNESSES

INVENTOR
HENRY KINGSFORD HARRIS
ATTORNEYS

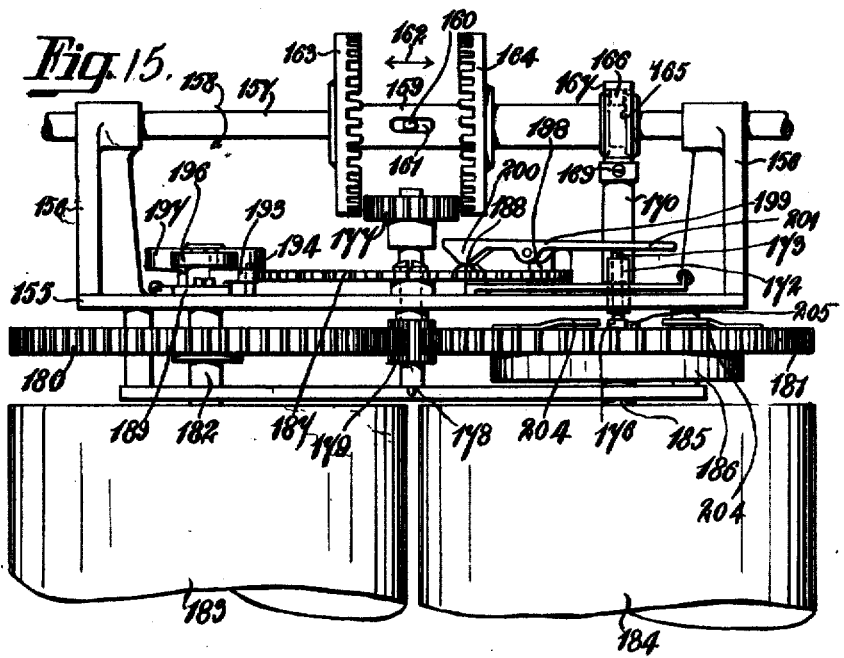

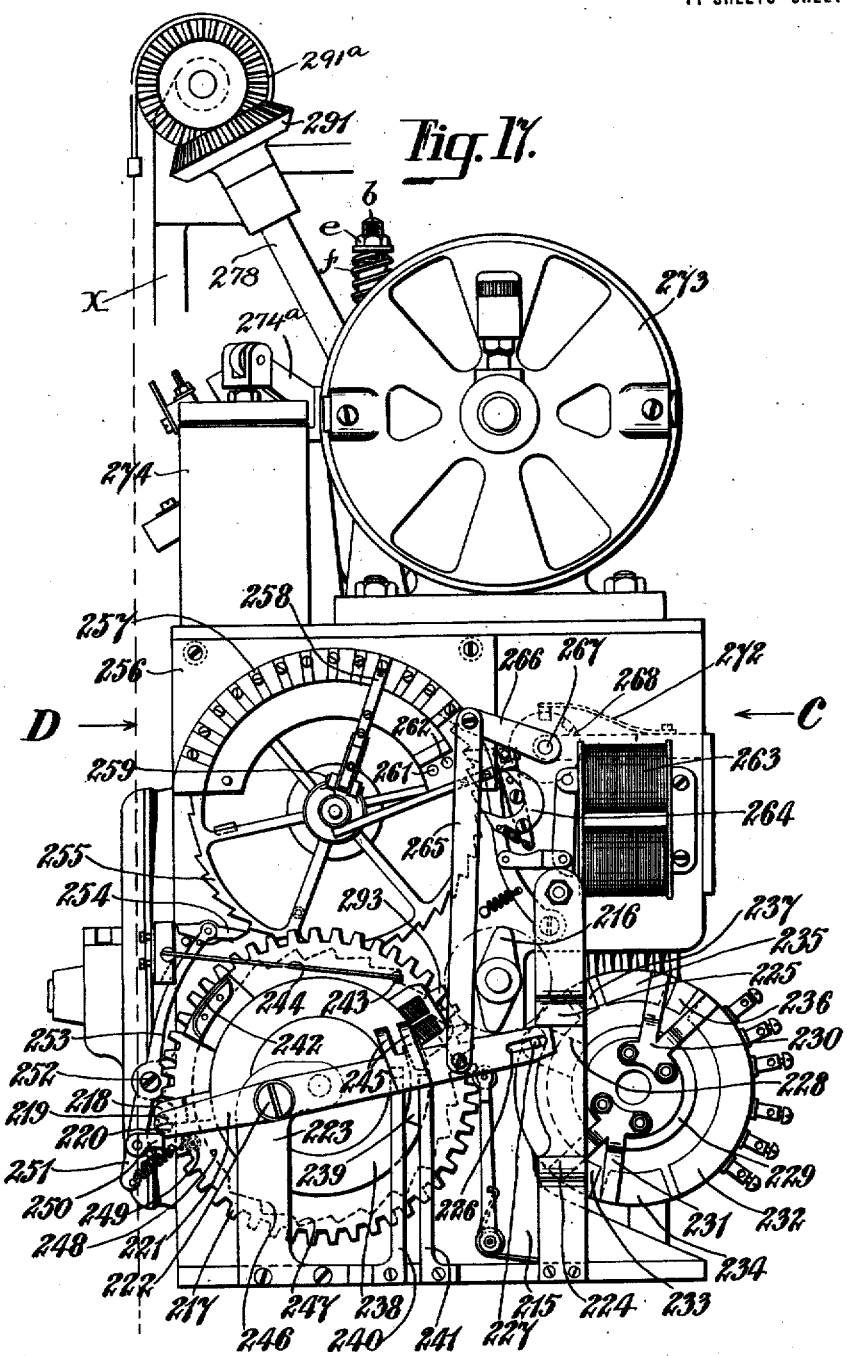

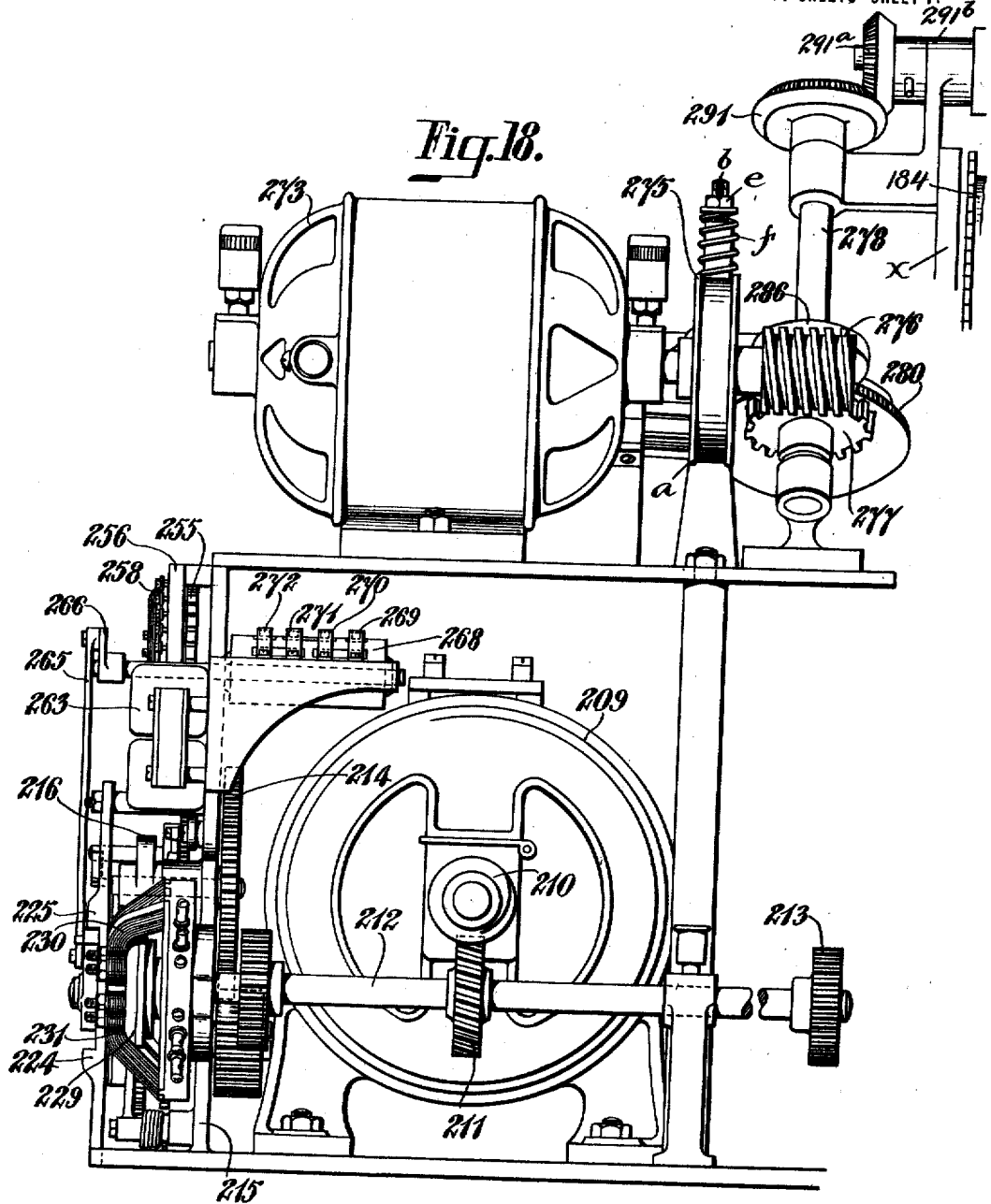

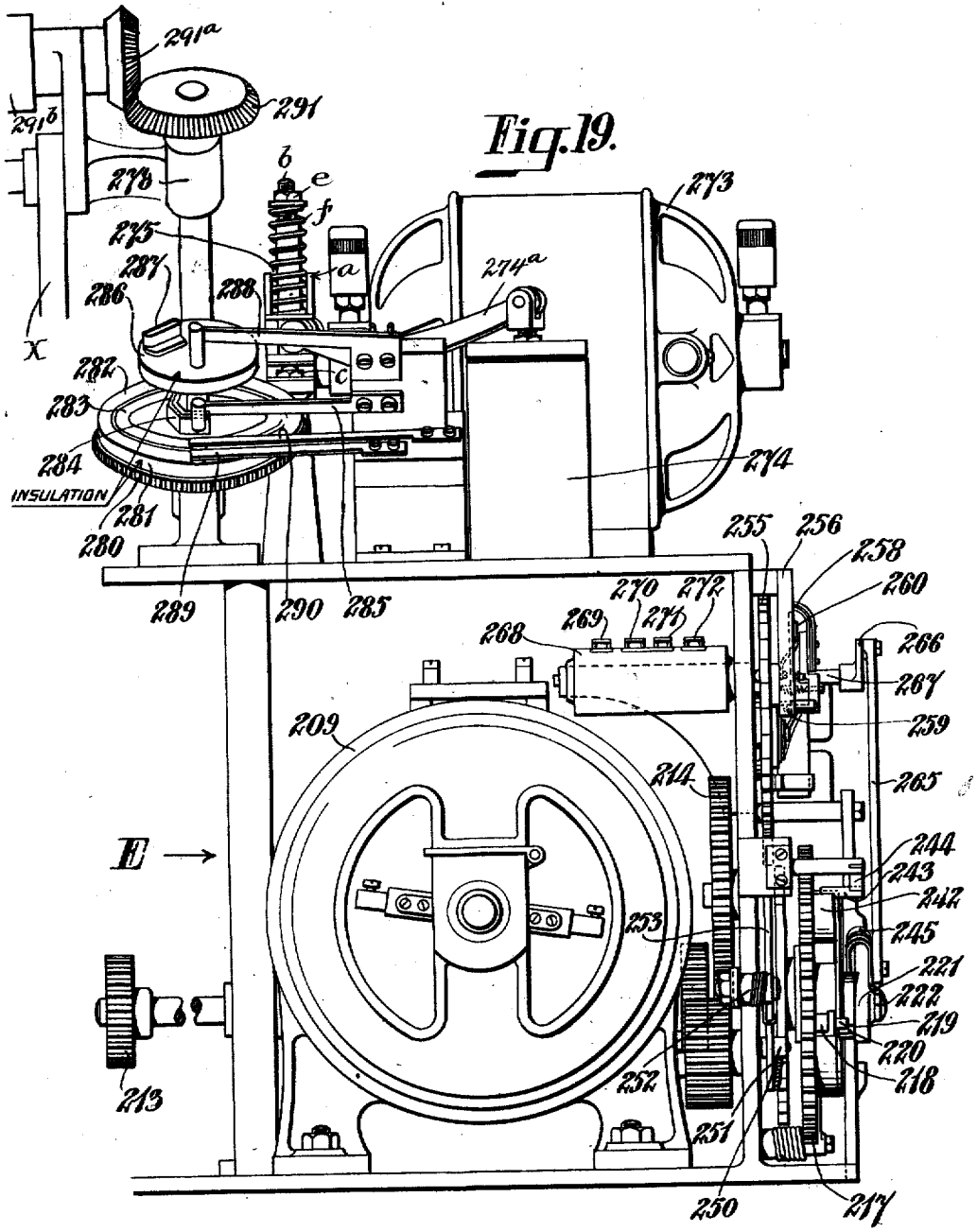

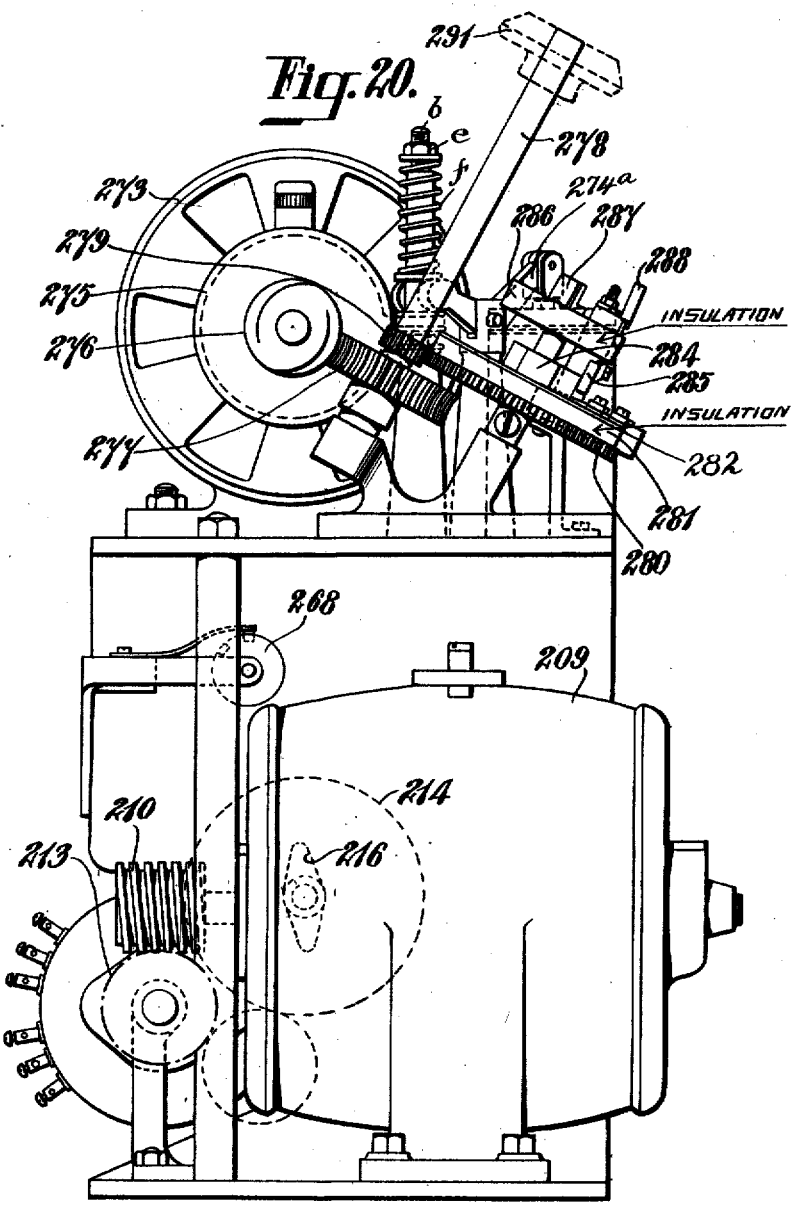

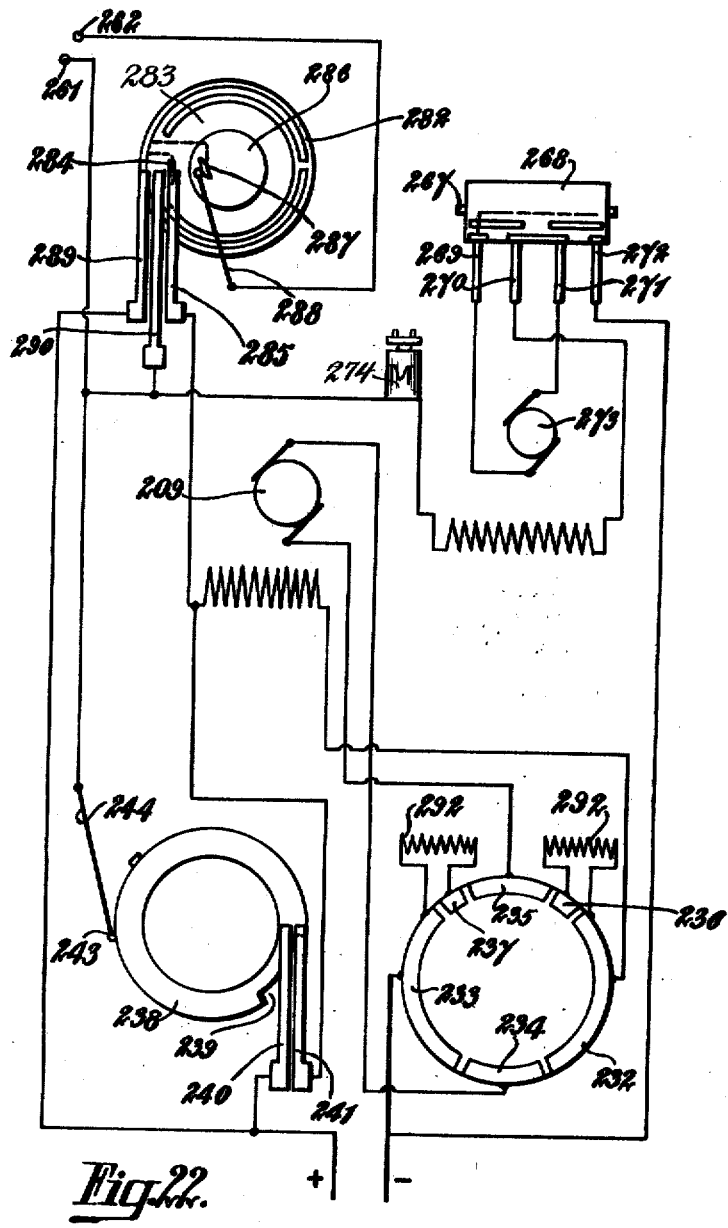

UNITED STATES PATENT OFFICE.

HENRY KINGSFORD HARRIS, OF WESTMINSTER, LONDON, ENGLAND.

ADVERTISING DEVICE.

1,313,816.  Specification of Letters Patent.  Patented Aug. 19, 1919.

Application filed February 5, 1914. Serial No. 816,730.

*To all whom it may concern:*

Be it known that I, HENRY KINGSFORD HARRIS, a subject of the King of England, residing at 96 Victoria street, Westminster, in the county of London, England, have invented certain new and useful Improvements in Advertising Devices; and I do hereby declare the following to be a full, clear, and exact description of the invention, such as will enable others skilled in the art to which it appertains to make and use the same.

This invention relates to devices for making public announcements exhibiting advertisements and for other purposes of a like nature and refers to improvements upon that type of such devices in which bands, cards, plates, disks or the like or one of a number of cards, plates or the like is brought into different positions or caused to take up certain positions, so as to present a coherent announcement or the like.

The invention further refers to that type of such apparatus in which the position into which the band, plate or the like of each unit, where the devices are arranged into units, is caused to move, is controlled by a selecting device so that the position in which the selecting device is set determines the particular announcement on the band, plate or the like of the particular card, plate or the like which is to be exhibited.

With devices of this character as previously constructed the selector has been set by means of electrical or other impulses so that one impulse was necessary for each step of the selector.

According to this invention I am enabled to greatly accelerate the setting of the selectors and consequently to provide an advertisement or other device of far greater utility than has previously been proposed.

According to the essential principle underlying my invention I so arrange that by using currents of different polarity, varying strength, continuous, alternating or induced or by any desired combination of these I am enabled to set the selecting devices through unit distance or through any desired multiple of unit distance according to a predetermined arrangement. In some cases also the direction in which the selecting device can be moved is determined by the direction or kind of current sent to the device.

It will also be seen that in place of using electrical impulses to accomplish the above objects, these may be also accomplished by impulses or movements of other character, for example pneumatic impulses or mechanical movements, although a much wider range of action can be obtained by the employment of electrical impulses.

My invention comprises various constructional arrangements for carrying out the above mentioned objects, together with different electrical methods of causing current impulses of varying strength or kind to be transmitted, so as to carry out the objects of the invention.

In the general way of carrying out my invention and according to a method found to answer very well in practice, units each consisting of a frame carrying rollers upon which a band or bands bearing letters, numerals, characters and other devices is caused to roll, are arranged side by side, each unit being furnished with a selecting device. Means are provided such as a selective switch for causing each electrical device controlling a selector to be brought into circuit so that the desired number of impulses are transmitted, setting the selector in the required position.

When all the selecting devices are set a controlling device or devices cause the bands of the units to be rolled backward or forward into their new position, as well as any other actions necessary for the adequate and convenient exhibition of the advertisements or the like. This controlling device is also actuated by suitable impulses preferably by those which cause the various units to be switched into circuit in succession, although in some cases each unit may be controlled from its own line, as for instance in machines controlled locally, which may be used for repetition work and be self contained and automatic.

The transmitting device from which electrical impulses or mechanical movement is transmitted to the selecting mechanism may either be located at the same place as the exhibiting device or may be arranged at a considerable distance therefrom, but where the control is by hand I prefer that recording apparatus shall be associated with the mechanism so that a record may be kept of the action of the devices and the indications set by the operator.

And in order that my said invention may be better understood I will now proceed to describe the same with reference to the drawings accompanying this specification, in which examples and modifications of carrying the invention into effect are shown although I wish it distinctly understood that I am not limited to these devices but may use any devices or apparatus which in operation will carry out the principles of the invention.

In the drawings:—

Figure 1 shows a front elevation of a simple form of setting mechanism for the selector.

Fig. 2 is a similar view to Fig. 1 of another setting mechanism for the selector;

Fig. 3 shows a fragmentary section on the line A B Fig. 2.

Fig. 4 shows a side elevation and Fig. 5 a plan of an escapement mechanism for controlling the selector.

Fig. 5ª is a detail sectional view of a modified spring construction for controlling the armature.

Figure 6:
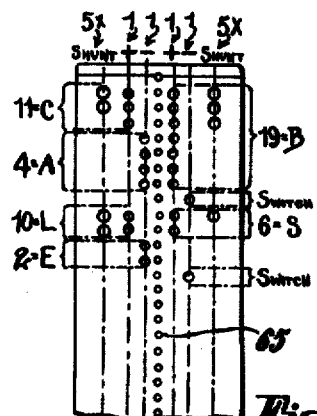

Fig. 6 shows a portion of a perforated tape for carrying out the objects of the invention.

Fig. 6ª is a diagrammatic view of a transmitting apparatus with which the tape is used.

Figure 7:
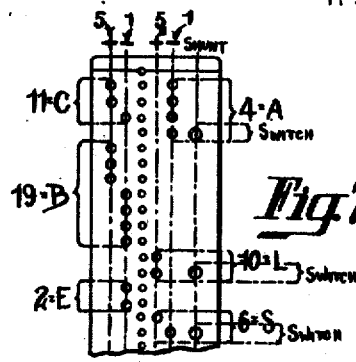
Figure 7A:
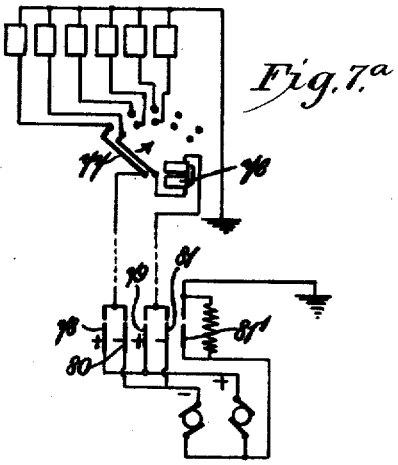
Figure 6A:
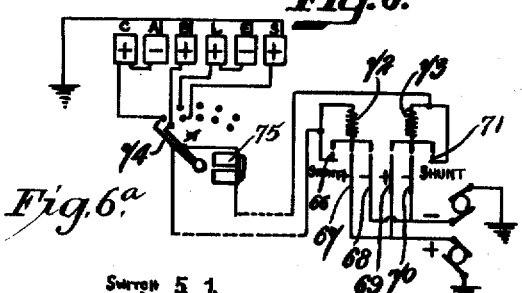

Fig. 7 shows another form of tape.

Fig. 7ª is a diagrammatic view of a transmitting apparatus used with the tape shown in Fig. 7.

Figure 8:
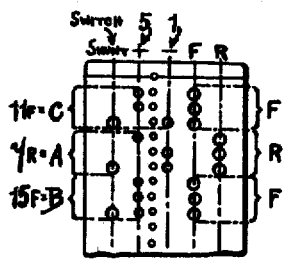

Fig. 8 shows another form of tape.

Fig. 8ª is a diagrammatic view of a transmitting apparatus used with the tape shown in Fig. 8.

Figure 9:
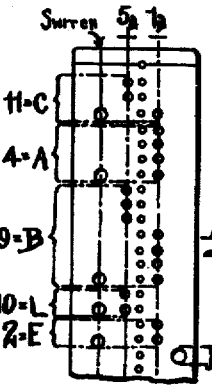
Figure 8A:
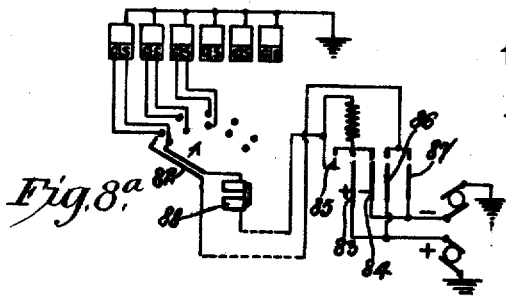

Fig. 9 shows another form of tape.

Fig. 10 is a detail side view of means for actuating the selector by weak and strong currents.

Fig. 11 is a similar view of another means for the same purpose.

Fig. 12 is a similar view of still another means for the same purpose.

Figure 13:
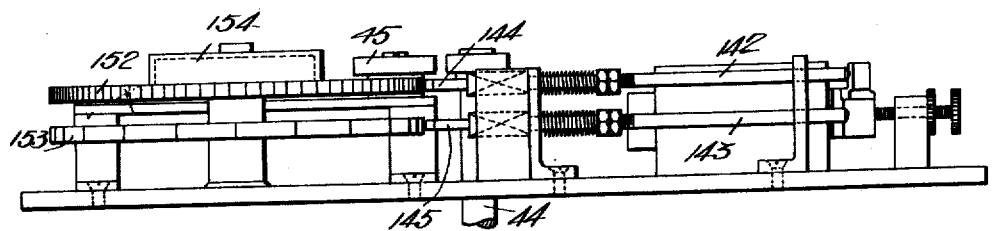

Fig. 13 is a side elevation, with the front magnet removed, of means for controlling two variations of distances by an escapement.

Figure 14:
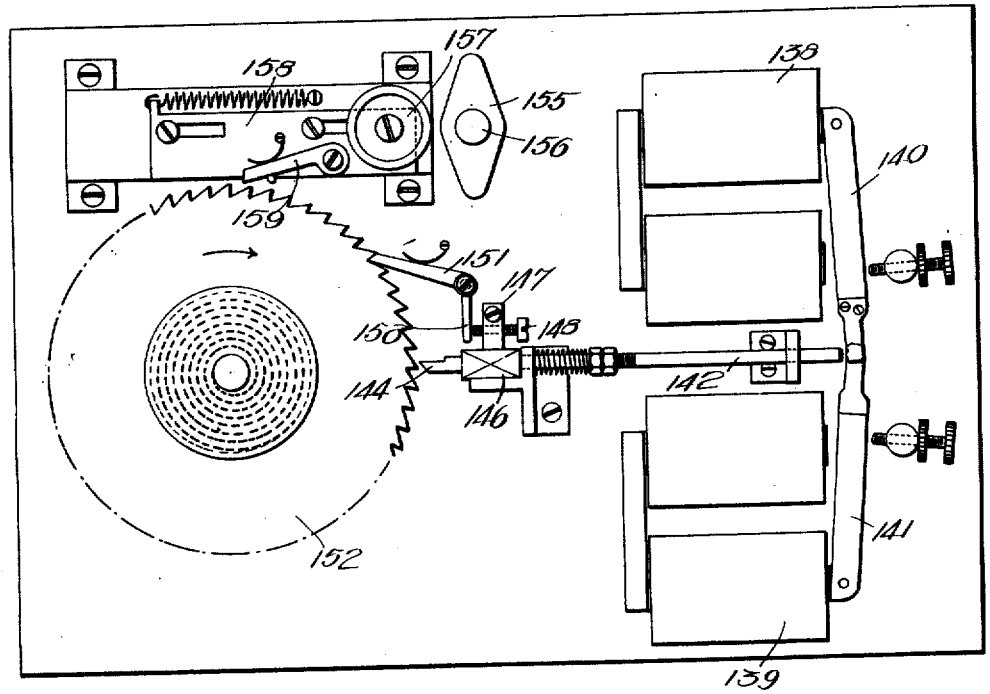

Fig. 14 is a plan view of the same.

Fig. 15 shows a portion of an advertising unit together with driving and controlling mechanism therefore, to illustrate a method by which the advertising band is caused to move in either direction according to the kind, strength or direction of the current applied thereto.

Fig. 16 is a plan of the same.

Fig. 17 shows an end elevation of a combined apparatus for controlling the sequence of operation of the units.

Fig. 18 shows a rear elevation of the same in the direction of the arrow C.

Fig. 19 shows a front elevation of Fig. 17 in the direction of the arrow D, and Fig. 20 shows a view looking in the direction of arrow E, Fig. 19.

Figure 21:
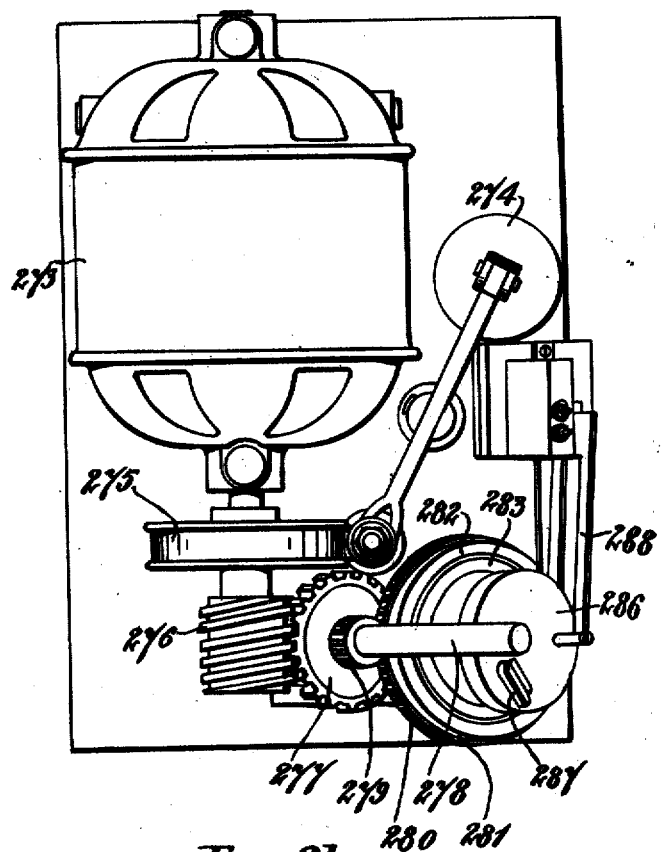

Fig. 21 shows a plan of the top portion of Fig. 17.

Fig. 22 is a diagram of connections of the controlling means illustrated in Figs. 17 to 21.

The same numerals of reference are employed to denote the same parts in all the views:—

Referring to Fig. 1 20 shows a ratchet wheel of small size, having 10 teeth. 21 shows another ratchet wheel of large size having forty teeth. The ratchet wheels 20 and 21 are fixed together and extended into a sleeve which passes through the plate 22. On the other side of the plate 22 the sleeve has mounted thereon an arm 23 provided with a projection or roller 24 which fulfils the function of the roller 33 in my former application filed Dec. 10, 1912, Serial No. 735,935. 25 is an arm carrying a roller kept pressed against the tooth of the ratchet 21 by means of a spring. 26 is an arm pivoted at 27 and kept pulled outward by a spring 28. The arm 26 has mounted at the upper end thereof a pawl 29 normally out of engagement with the ratchet 20. 30 is a spring keeping the pawl 29 pressed normally downward and 31 is a pin which when the pawl 29 is in the position shown at Fig. 1 bears upon the inclined tail of the said pawl and holds it out of the path of the teeth of the ratchet 20. 32 is a link which is connected to the armature of an electro-magnet and when a current, for which the electro-magnet is designed is sent around said electro-magnet $x$ the attraction of the armature causes the link 32 to be pulled in the direction of the arrow and thus rocks over the arm 26 bringing the pawl 29 into contact with one of the teeth of the ratchet 20 and causing the said ratchet to be turned through the distance equal to one tooth.

This causes the projection 24 also to be turned through a certain distance. When the current around the electro-magnet ceases the arm 26 springs back under the action of the spring 28 into contact with the stop 34. 35 is another arm pivoted at 36 and carrying at its upper end a spring controlled pawl 37. 38 is a spring for normally keeping the arm 35 against the stop 39. The pawl 37 is kept clear of the teeth of the ratchet 21 by means of a rear inclination engaging with the pin 40. 41 is a link connected to the armature of another electro-magnet $x'$. When the current, for which this electro-magnet is designed, energizes the said electro-magnet it causes the arm 35 to be pulled over bringing the pawl 37 into engagement with the teeth of the ratchet 21 thus causing the said ratchet to move through a distance of one tooth and consequently the projection 24 through a certain distance. It will be seen from the drawings that the angular distance through which the projection 24 is caused to turn when the pawl 29 is actuated is much greater than the angular distance through which it turns when the pawl 37 is actuated. By this means it is possible to utilize the currents passing around the respective electromagnets so that the projection 24 may be set in any desired position with the minimum number of impulses. For instance, in the case under question, where, as previously explained the inner ratchet has ten teeth and the outer ratchet forty teeth, should it be required to set the projection 24 through a distance corresponding to ten units of distance it is simply necessary to send two impulses to the electro-magnet controlling the link 32 and two impulses to the electro-magnet controlling the link 41, when the projection 24 will have been sent through the required distance.

By this means it is possible to so design a perforated tape or other transmitting means that with the required means for sending impulses, currents of one strength, direction or kind can be sent to one electromagnet and a current of another strength, or kind can be sent to the other electro-magnet over the same line.

It will be obvious therefore, that where strong and weak currents are employed the strong current will operate the electro-magnet of the weak current, and may cause the mechanism shown at Fig. 1 to lock. The form of device shown at Figs. 2 and 3 are designed to overcome this possible drawback. In these figures 42 is a ratchet wheel similar to the ratchet wheel 20. This ratchet wheel as will be seen from Fig. 3 has formed therewith or is mounted upon a sleeve 43, which extends right back through the plate 44. 45 is an arm fixedly mounted upon the sleeve 43 and consequently turning with the ratchet 42. Mounted loosely upon the sleeve 43 in the space between the ratchet wheel 42 and the arm 45 are two ratchet wheels 46, 47 of identical size and number of teeth but with their teeth in opposite directions. 48 is a spring controlled pawl mounted upon the arm 45, so as to be able to engage with the teeth of the ratchet wheel 46 and to turn with the said ratchet wheel when it moves in a counterclockwise direction. The wheels 46 and 47 are so constructed that they are compelled to turn together. In this case the arms 26 and 35 with their associated parts are also employed as also the spring pressed link 25.

When the arm 26 is actuated by the link 32, the pawl 29 comes into engagement with the ratchet 42 and causes the sleeve to turn carrying with it the arm 23 and the projection 24 which latter it is desired to set.

When the arm 35 is actuated by means of the link 41 the pawl 37 which it should be here stated only engages with the teeth of the ratchet wheel 47, causes the said ratchet wheel to be moved. As the ratchet wheel 47 is coupled to the wheel 46 it also causes this latter to move and the teeth of the ratchet 46 engage with the pawl 48 carrying around the arm 45 and consequently rotating the sleeve 43 which as before stated moves the projection 24 through the required distance. The links 32 and 41 are to be connected with the armatures of electro-magnets, the same as shown in Fig. 1.

With this form of the device should both the arms 26 and 35 be actuated together it will be seen that there is no possibility of locking.

In Figs. 1 and 2, 49 is a projection upon the arm 26 which when the said arm is moved over, only allows the ratchet wheel 20 to move through one tooth and 50 is a projection on the arm 35 having a similar object with reference to the ratchet wheel 21.

Referring to Figs. 4 and 5, these show a double selector operated in the manner of an escapement and controlled by means of a double polarized magnet 51. 52 is the armature normally located intermediate the poles of the permanent magnet and retained free in this position by means of springs 53 53ª in the manner hereinafter described. The armature 52 has pivotally mounted at the end thereof a pivot pawl 54 controlled by a spring 55. The nose of this pawl normally engages with the teeth of the escapement wheel 56. Mounted at one side of the escapement wheel 56 so as to turn therewith is a similar wheel 57 the teeth of which are of the same number as, but set intermediate to the teeth of the wheel 56. 58 is a spring barrel. When a current of one direction passes to the electro-magnet 51 it causes the armature to move in one direction, when a current of the opposite direction is sent it causes the armature to move in the opposite direction. 59 is a wheel mounted at the other side of the wheel 56 to the wheel 57 and so as to turn therewith. This toothed wheel 59 is provided with eight teeth and the wheels 56 and 57 each with forty teeth. 60 is a guard plate provided with recesses or slots 61 in the neighborhood of the toothed wheel 59. It is of course understood that the pressure of the spring in the barrel 58 tends to turn the wheels in the direction of the arrow 62, and that the nose of the pawl 54 is normally in engagement with one of the teeth of the wheel 56. If now a current of one polarity is sent through the electromagnet 51 it causes the armature 52 to move in the direction of the arrow 63 as shown in Fig. 5, it also causes the nose of the pawl to leave the teeth of the wheel 56 and to come into the path of the next succeeding tooth of the wheel 57 which allows the escapement to move through half a tooth.

When the current through the electro-magnet is broken the spring 53ª brings the pawl back to its original position allowing the escapement to complete the other half tooth. In this way it will be seen that the parts have moved through unit distance and it will be understood that they are in connection with a roller or projection such as 24 and have, therefore moved through the required distance. When a current of opposite direction to the last is sent around the electro-magnet 51 it is caused to move in the direction of the arrow 64, then the nose of the pawl passes through one of the slots 61 in the guard plate 60 behind a tooth, and the spring in the barrel allows the wheels to turn until the next tooth, some distance away, comes into contact with the nose of the pawl. Upon breaking the current the pawl passes through the slot 61 opposite this tooth and resumes its original position.

Should the current through the electromagnet be broken before the next tooth reaches the pawl it is prevented from springing back to wheel 56 by the portion of the guard plate 60 until it comes to the slot in the said guard plate.

At Fig. 5ª is shown a modified spring construction for controlling the armature as a substitute for springs 53, 53ª. In this figure the armature 52 is shown in cross section and passing through a slot 296 in the tube 297. 298 and 299 are stops against which the ends of compression springs 300 and 301 take, the other ends of the springs coming against the end plates of the tube 297.

In the normal position, the armature 52 is not acted upon by either of the springs 300 or 301 but is of such size that it just touches each of these springs.

When the armature is pulled in either direction by the action of its electro-magnet it will be readily understood that it compresses one of the springs and is not influenced in the slightest by the other spring, so that upon the magnet being demagnetized and the pawl controlled by the armature released, the said armature is forced back to its original position. With this construction the difficulty of providing a strictly balanced pair of springs is obviated, and the armature always returns to its normal intermediate position.

It should be here observed that when using this type of selector it is imperative that the impulses which set the pawl into a position to release the escapement through a multiple of unit distance should be actuated first in order to insure that the pawl is opposite the slot in the guard plate.

The means for setting back this form of selector as well as those forms of selector previously described consists of a mechanism similar to that described and shown in the heretofore mentioned application, although it is of course obvious that any suitable mechanism for effecting this object can be employed.

Figs. 10, 11 and 12 show means for actuating the selector wheel so that it is set by weak and strong currents. Referring to Fig. 10, 90 is the magnet suitably connected to the circuit. The magnet is provided with an armature 91 controlled by a spring 92. The armature 91 carries a spring-controlled pawl 93. 94 is a stop for limiting the movement of the armature. 95 is the ratchet wheel. Dealing first with the action of the armature 91, when a weak current is sent around the magnet 90 the armature 91 is attracted and its pawl 93 moves the ratchet wheel 95 around through one tooth. It is prevented from moving the ratchet through more than one tooth by coming into contact with the stop 94.

96 is another armature at the other end of the magnet 90 controlled by a spring 97 much stronger than the spring 92. An extension of the armature 96 carries a spring pressed pawl 98. 99 is a stop simply mounted upon the framework or base plate carrying the mechanism.

When a strong current is sent around the magnet 90 the armature 96 is attracted. This causes the spring pawl 98 to engage with the teeth of the ratchet 95 and to move the said ratchet around through a number of teeth say, four. Further movement of the pawl is prevented by coming into contact with the stop 99.

It will be observed that when the stronger current passes around the magnet 90 the armature 91 will also be attracted, bringing the pawl 93 into engagement with the ratchet wheel but this however does not prevent the wheel being turned around through a multiple number of teeth as the teeth of the ratchet slip under the pawl 93 which moves outward against the action of its spring.

Referring to Fig. 11, 100 is a solenoid provided with a central tube in which a movable iron core 101 is adapted to slide.

The core 101 is connected to a brass or other nonmagnetic rod 102 which passes up through a suitable guide and comes to rest normally beneath the end 103 of a lever 104 pivoted at 105. The lever 104 carries a spring controlled pawl 115 adapted to engage with the teeth of the wheel 107. 108 is a tubular sleeve resting upon the end 103 of the lever 104 and having fitting loosely therein the end of a rod 109, connected to a weight 110 sliding in a casing 111. 112 is a pin in the end of the rod 109 which works in slots 113 in the sleeve 108. 114 is a compression spring.

In reference to the action of this form of the device, when a weak current is sent around the solenoid, the core 101 is drawn upward causing the end of the rod 102 to come into contact with the end 103 of the lever 104, raising the said lever so that the pawl 115 moves the wheel 107 around through one tooth. By this time the end 103 of the lever has caused the spring 108 to be compressed and has come into contact or nearly into contact with the end of the rod 109. Any further movement upward of the lever would have to lift the weight 110 but the levers and weights are so designed that the weak current sent around the solenoid is unable to do this, thus the wheel 107 is only moved through one tooth. When, however, a stronger current is sent around the solenoid 100 the upward movement given by the core 101 is sufficient to overcome the weight 110 which is lifted upward, until a suitable stop prevents further movement. In this way the pawl 115 moves the wheel 107 through some desired predetermined multiple of unit distance. 116 is a roller catch for preventing any backward movement of the wheel 107.

Referring now to Fig. 12, this shows another arrangement by means of which currents of two strengths control the movements of the selector through unit distance and a multiple of unit distance. In this case 117 is the magnet which is provided with an armature 118 the extension 119 of which comes beneath one end of a spring-controlled rod 120; the other end of the rod 120 has fastened thereto one end of a sleeve 121, into the other end of which fits loosely a rod 122. The rod 122 is surrounded by a compression spring 123; 124 are locking nuts. 125 is a pin working in slots 126 in the sleeve 121. The outer end of the rod 122 is provided with a pawl 127. It will be seen that when the armature 118 is attracted, the rod 120 is pushed upward. This causes the sleeve 121 to compress the spring 123 and force the pawl 127 into engagement with the ratchet wheel 128 moving it around through one tooth.

The magnet 117 is also provided with another armature 129, an extension of which comes below one end of a rod 130 kept pressed downward by means of a spring stronger than the spring pressing down the rod 120. The other end of the rod 130 carries a pawl 131 adapted to engage with a ratchet wheel 132, the teeth of which are some multiple of the teeth upon the concentric ratchet 128. When the armature 129 is attracted, the pawl 131 causes the ratchet wheel to be moved through one tooth.

The following arrangement is provided for preventing the pawl 127 actuating the ratchet 128 when the pawl 131 is actuated. 133 is a pivot mounted upon some suitable part of the base plate or framework, provided with an arm 134 adapted to come into the pathway of a stop 135 carried by the upper end of the rod 130.

136 is another arm of the lever which comes normally a short distance above a projecting pin 137 carried by the upper end of the rod 122.

It will be seen that when the armature 118 is operated, the pawl 127 can operate upon the ratchet wheel 128, but when the armature 129 is attracted the rod 130 causes the stop 135 to lift up the arm 134 of the lever which depresses the arm 136 and while the pawl 131 operates upon the ratchet wheel 132, the said arm 136 prevents the pawl 127 from operating the ratchet wheel 128. The slot 126 and spring 123 allow the action to take place as will be readily understood.

Referring now to Figs. 13 and 14; these figures show how two variations of distance are controlled by an escapement, although it is quite obvious that more than two variations of distance can be controlled, for instance several wheels may be mounted side by side each provided with a number of teeth some multiple of the teeth of the others, and upon suitably actuating one or more pawls, the projection or other part which was being set can be allowed to move over the required distance. In these figures 138 and 139 are magnets, the armatures 140 and 141 of which are adapted, which attracted by their magnets come into contact with the ends of rods 142 and 143. These rods are kept pressed backward by suitable adjustable springs and carry at their front ends pawls 144 and 145. The rods are also provided with sliding blocks 146 of square section to prevent any rotation. These blocks carry lugs 147 provided with an adjustable screw 148, which normally rests behind one arm 150 of a bent lever, the other arm 151 of which constitutes a spring-controlled locking pawl. The arm 151 normally rests against teeth of two ratchet wheels 152 and 153, which are joined together, and are controlled by a spring box 154. When the current of one kind or strength is sent to the apparatus the magnet 138 is operated. This causes the rod 142 to be pushed forward, the screw projection 148 of which causes the locking pawl 151 to be removed from the teeth on the wheel 152. The pawl 144, however, moves forward at the same time and thus escapement ratchet 152 moves around through only one tooth, as when the rod 142 again moves backward under the action of its spring, the pawl 151 is again pressed forward by its spring into engagement with the teeth of the said ratchet wheel.

When a current of another strength or kind is sent to the apparatus the magnet 139 is energized. This causes the rod 143 to be pushed forward. The screw projection 148 in connection with this rod causes the locking pawl 151 to be moved out of engagement with the teeth of the wheel 153, the spring in the spring barrel 154 thereupon causes the wheel 153 to turn until the next tooth is stopped by the pawl 145. Upon the rod 143 moving backward the locking pawl 151 again comes into engagement with the teeth of the ratchet wheel 153.

Although the action of the wheel 152 was described first it is in most cases preferable that the impulses controlling the magnets for the multiple ratchet wheel should be sent first.

In Figs. 13 and 14 is also shown a method by which the ratchet wheels are set back to their original position. This is effected by the following mechanism. 155 is a cam mounted upon a shaft 156 in connection with the units carrying the advertising bands or the like. The shaft 156 is caused to rotate as the bands or the like are moved forward into their exhibiting position. 157 is a roller carried by a spring-controlled slide 158. The slide 158 carries a spring-controlled pawl 159 adapted as the slide is reciprocating to come into engagement with the teeth of the ratchet wheel 152. When the bands are being moved forward into their reciprocating position the cam 155 causes the slide 158 to be reciprocated and each time the slide moves forward the pawl 159 winds up the spring-controlled ratchet wheel 152 through one tooth, the pawl 151 acting as a locking pawl.

It will be understood that the particular modified constructions just described are simply examples of methods of constructing this portion of the device according to my invention and not in any way exhaustive, being given merely by way of illustration.

It may be remarked that in some cases where it is desired to work sometimes one magnet alone and sometimes two magnets of different types, one may have solid and brass bobbins while the other may be of soft laminated iron, former wound. These magnets may be connected in parallel, and the alternating current would then be used for the weak movement and would operate the laminated magnet, while a continuous current would operate both magnets.

In one arrangement a magnet of square section laminated and former wound is also so wound and connected to form a core type transformer, the secondary winding of which is coupled to a second alternating magnet. The continuous current then works the first magnet but the induced current, on the make and break, is not sufficient to overcome the inertia of the armature of the second magnet, which, however, is operated by the greater induction of the alternating current.

In order to make the operation of the before mentioned devices better understood, various forms of perforated tapes will be described for sending current impulses of different direction and strength. For example, in Fig. 6 a portion of the tape is shown provided with the usual feeding perforations 65 in the center. On the extreme left a line of perforations is shown headed at the top "shunt" next thereto another line of perforations headed "+" and coming at the side thereto another line headed "—", on the other side of the feeding perforations 65 a line of perforations headed "+" next a line headed "—", and finally another line headed "shunt".

In Fig. 6ª is shown a diagram in which 66, 67, 68, 69, 70 and 71 are the pins of a transmitting apparatus capable of completing circuits of different polarity or strength. The pins labeled + and — as will be seen are connected to the motor generators each with an earth return so that two of the pins are + and two —. The two outer contacts as will be seen constitute a shunt on the line so that the resistances 72 and 73 are in circuit. When contact is made through perforations in the tape and the resistances shunted then contact is made through the outer pin. 74 is an arm of a selecting switch more particularly described hereafter in relation to the control. This arm 74 is furnished with two conductors insulated from each other each being connected to one of the lines. Upon one line an electro-magnet 75 is located, which actuates the movement of the arm 74 in the manner of an electro-magnet escapement or ratchet.

It will be seen that the two contacts of the arm 74 work over a series of double contacts and that these double contacts are connected to the units shown diagrammatically by small rectangles.

These units are connected to the contacts as shown and to a common earth return, coöperating with the earths of the generators. In the units polarized magnets are employed, their signs being denoted on the rectangles, representing the units.

To give a concrete example of the working of this form of the device a system of notation is taken in which in order to cause the letter C to be set, eleven impulses must be sent, the letter A four impulses, the letter B nineteen impulses, the letter L, 10 impulses, the letter E two impulses and the letter S, six impulses all in the forward direction, starting from zero.

It must also be assumed that each of the units is provided with a double escapement or selecting mechanism such as any one of those shown at Figs. 1 to 5, and that the electro-magnet controlling the movement of five units of distance is actuated by a strong current and that the electro-magnet allowing the parts to move over unit distance is actuated by a weak current, and that both electro-magnets in each unit are polarized with the same polarity and the polarities of the magnets in the units are represented by the signs + and —.

It will be observed upon studying Fig. 6ª that each of the lines is capable of being connected with a positive or negative pin through resistances or if the shunt pin or brush is in operation, not through the resistances. It therefore follows that each line can have impulses sent either positive or negative and either weak or strong.

Assuming now that the tape is being passed between the pins and their contacts, in the first position in order to set the letter C it will be seen that two perforations are shown on the shunt line. These cut out the resistance 72 and allow the two perforations on the positive line opposite to the two shunt perforations to cause the positive pin to send two impulses to the line and as these do not pass through the resistance these impulses are of a strong character and actuate the electro-magnet which causes the selector to move through a distance corresponding to ten units of distance. The next perforation on this positive line has not a perforation in the shunt line parallel thereto, so the positive pin transmits a current through the resistance 72 which is, therefore, of a weak nature and operates the electro-magnet which moves the selecting device through unit distance. In this way it will be seen that the selector for the first unit has been set by two strong and one weak positive current through a distance corresponding to 11 units of distance. At the same time on the other line (see the right hand portion of Fig. 6) three strong positive impulses have been sent causing the selector in the unit marked B to move through a distance corresponding to 15 units of distance, and the tape continuing to travel four weak impulses are sent over this line, bringing the total number of impulses up to 19, which corresponds to the setting of the letter B. At the same time as this last four impulses on the one line, four weak negative impulses have been sent on the other line through the pin 68, which causes the selector in the unit marked A to move through four units of distance and to bring the selector into a position corresponding to the letter A.

As the band tape continues to travel the next contact in order is one on the negative line toward the right hand side of the tape. This makes a contact through the pin 70 and the electro-magnet 75 is so arranged that it is actuated by a weak negative impulse on this line. Therefore, when this last mentioned contact is made the electro-magnet 75 is actuated and causes the arm 74 to move in the direction of the arrow and come on to the next pair of contacts. Here it will be seen that upon the tape still further moving, two strong positive impulses are sent to one line through the pin 66 which causes the selecting mechanism of one particular unit to which the line is now connected to be moved through 10 units of distance, thus setting the selecting mechanism in a position corresponding to the letter L. At the same time upon the pin 69 making contact one strong and one weak positive impulse is sent to the other line, which causes the selector to be set in a position corresponding to the letter S for the last positive unit. Upon the tape still continuing to travel two weak negative impulses are sent through the pin 68 and set the selector of the last unit but one into the position corresponding to the letter E. When the tape travels to the next position a weak negative impulse is sent to the electro-magnet 75, causing the arm 74 to move on to the next pair of contacts.

When the advertisement which the advertising units have been exhibiting is set back to zero or starting position and again turned into the forward direction the mechanism controlling the various bands or the like will be stopped by the selectors so that the previously set word or advertisement, which in the present instance is the word "Cables" will be exhibited.

Referring now to Figs. 7 and 7ª the tape in this case is designed for working with two lines and each unit is provided with two polarized electro-magnets one of positive polarity and the other of negative polarity, the magnet of positive polarity being so arranged that it moves the selector or allows the escapement to move through five units of distance while the magnet of negative polarity allows the selecting device to move through one unit of distance, or each unit may be provided with one magnet of the type shown at Figs. 4 and 5.

It will be seen that one shunted line is employed which allows a strong impulse of either polarity to be sent to line and to have an earth return by means of which the magnet 76 controls the movement of the arm 77, it being observed that the armature of this magnet is spring controlled and the amount of spring tension is such that the said armature is not actuated when too weak impulses of either polarity pass around the magnet.

In Fig. 7ª positive pins 78 and 79 are connected to their source of supply and negative pins 80 and 81 to their source of supply, a pin 81ª being in connection with a shunt, which may be on line or to earth.

Returning now to the tape shown in Fig. 7 the selector for the letter C is set in position as will be understood from the previous explanation by two positive impulses and one negative on one line, and on the other line concurrently the selector for the letter A is set into position by four weak negative impulses, the last one being strengthened by cutting out the shunted resistance 81¹, and consequently causing the electro-magnet 76 to be actuated. Upon the tape continuing to move three positive impulses are sent to the first mentioned line and four negative which set the selector in a position to subsequently allow the letter B to be brought into position. The selector for the letter L is set by two positive impulses through the pin 79, the last impulse being strengthened by cutting out the resistance through the shunt perforation and consequently operating the switch. The selector for the letter E is set on the first line by two negative impulses and the selector for the letter S is set on the other line by one positive and one negative, the last impulse being strengthened and consequently operating the switch. In this way the selectors for the word "cables" are set.

Referring now to Figs. 8 and 8ª, in this case one line is employed for the setting of the selector and one line for controlling magnets determining the direction in which the selector shall move consequently the switch 82 is moved once for each unit.

It will be seen from the lower portion of this figure that the pin 83 which is positive, and the pin 84 which is negative, together with a shunt 85 operate the selector indicated diagrammatically by S in each of the units and that the pins 86 and 87 operate through the other line the gear for determining the direction of rotation of the selectors denoted by the letter G.

It should be observed that when a positive current is sent to the line controlling the selector, a polarized electro-magnet is operated, which moves the selector through five units of distance, and when a negative current is sent, the selector is moved through a unit distance. The switch 82 is operated in this instance by the electro-magnet 88, by means of strengthening the last impulse of each setting, the armature of the magnet 88 being so arranged that it is not affected by the weak impulses which set the selectors. Upon the tape are marked F and R indicating "forward" and "reverse." The perforations of the tape indicated by F and R pass the pins 86 and 87 and cause impulses (positive or negative) to be sent to the line (other than the one previously described in reference to the pins 83, 84 and 85) for determining the direction of rotation. Proceeding with the example, the letter C is set by two positive impulses and one negative impulse on one line the current flowing on the other line being such that the gear is put in the forward position.

As the letter A is represented by four impulses, in order to set the unit into a position corresponding to the position of this letter, it must be set back through a distance of 7 units of distance, presuming that the last letter set in this unit was C, which is only taken as an example however, because its notation is known and must not be supposed to have any connection with the letter C set in the first unit, therefore one positive impulse and two negative impulses are sent to one line and the current flowing on the other line causes the reverse gear to be thrown into position, thus setting the letter A.

In order to set the letter B the parts are turned forward through 15 units of distance presuming the last letter set in this unit was the letter A. This is arranged by sending three positive impulses to one line and the other line throwing the forward gear into position.

Referring to Fig. 9 this shows a simplified tape working with a single line and earth, the switch being operated by strengthening the last impulses.

The method of operation will be understood having reference to the other figures already described.

At the lower part of this figure a perforation is shown marked "T". This may stop the motor with a magnetic switch or cut out the driving clutch or start a timing device which would restart the movement when required.

Referring to Figs. 15 and 16 in these figures is shown somewhat diagrammatically a method by which the direction of rotation of the roller controlling the band carrying the letters or other characters is controlled by means of discriminating currents either of different polarity, strength or kind. 155 is a framework upon which are mounted brackets 156. 157 is the main driving shaft which when running is constantly turning in the direction of the arrow 158. 159 is a sleeve mounted so as to slide within certain limits upon the shaft 158 but constrained to rotate therewith by means of a projecting pin 160 projecting through the slot 161 which slot limits the movement of the sleeve 159 upon the shaft 157 in the direction of the arrow 162. Mounted upon or formed with the sleeve 159 are two toothed wheels 163 and 164 the teeth of which are formed on the faces at the edge thereof. The sleeve 159 is continued beyond one of those wheels and has formed thereon two collars between which is formed an annular recess 165. Within the annular recess 165 pins 166 upon a forked collar 167 normally rest. The forked collar is continued backward into an arm 168 and is pivoted at 169 upon a post 170. The bottom of the post 170 which is free to rotate has projecting therefrom an arm 171 at the outer end of which is formed a sleeve 172 in which slides a pin 173 constantly pressed upward by means of a spring 174. The pin 173 passes through a slot 175 in the casing and is provided with an enlarged portion or head 176 for the purpose hereinafter explained. The head 176 is normally kept pulled against the under side of the plate or frame 155. 177 is a toothed pinion so located that either of the toothed wheels 163 or 164 can be brought into engagement therewith. The spindle upon which the pinion 177 is mounted passes through the casing and has its bearing at 178. 179 is another pinion mounted on this spindle which gears with two large gear wheels 180 and 181. The gear wheel 180 is fixedly mounted upon a spindle 182 to which one of the large rollers 183 of the exhibiting device is fixed. The other large roller 184 is mounted upon a spindle 185 connected by means of the spring barrel 186 with the other large toothed wheel 181, the spring barrel being provided so as to compensate for the slight degree of variation of the diameters of the rollers 183 and 184 while the band carrying the numerals, letters or other characters is being wound from one roller to the other.

In the drawings the band is not shown in position but it will be readily understood that the band winds from one roller to the other. 187 is a toothed wheel mounted upon the plate 155. This toothed wheel has formed upon the upper surface thereof and mounted at the outer edge in a certain position a hump 188 formed by two oppositely inclined portions, as will be seen from Fig. 15. 189 is a slide working upon pins 190 by means of slots 191 and kept pulled in to the position shown at Fig. 16 by means of a tension spring 192. 193 is a spring controlled pawl mounted upon the slide 189 which when the parts are in the position shown at Fig. 16 has its nose kept clear of the teeth of the wheel 187 by means of the pin 194 engaging against an inclined portion 195. 196 is a roller standing somewhat above the level of the other parts and against which the cam 197 is adapted to take. The cam 197 is formed upon an extension of a spindle 182 and each time the roller 183 is rotated the cam 197 causes the slide 189 to be reciprocated backward and forward twice thus causing the pawl 193 to operate upon the wheel 187 twice and move it through a distance of two teeth. Mounted in a bracket 198 so as to project over the wheel 187 is a lever 199. One end of the lever is formed with a double inclined projection 200 and the other end is provided with a rounded tail 201. The rounded tail comes above the spring controlled pin or slide 173 while the projection 200 comes in the path of the hump 188. 202 is a rod in connection with the armature of an electro-magnet capable of being operated by a current of one polarity or of a certain strength or kind while 203 is a rod in connection with another electro-magnet capable of being operated by means of a current of a different polarity, strength or kind.

It has been omitted in these views for the sake of clearness to show any method of setting the wheel 187 so that the hump 188 is brought into position to correspond to the number of impulses transmitted but it will be obvious that any one of the devices shown at Figs. 1 to 5 can be utilized for this purpose.

Assuming that the unit which the before mentioned description forms a part is exhibiting a certain numeral, letter or character and it is desired to change to another numeral, letter or character to accomplish this, one or other of the wheels 163 or 164 would have to be in gear with the pinion 177. Then upon starting the motor the rollers 183 and 184 would be turned in a certain direction. At each rotation of the roller 183 the wheel 187 would be moved through two teeth as previously explained thus setting back the hump 188 which has previously been set forward according to the number of impulses transmitted to the zero position that is the position shown in the drawings. As the hump 188 approaches this position it comes beneath the projection 200 and raises this projection upward. This rocks over the lever 199 and causes the curved tail thereof to press upon the spring pin 173. This last action causes the projection 176 to be forced upon the wheel 181. On the top of this wheel a number of flat spring plates 204 are provided with a space between the adjacent ends thereof located intermediate between which is a fixed upstanding projection 205. The enlarged projection 176 rides over the next approaching spring plate 204 and forces the said spring plate downward. When it reaches the end thereof it immediately springs down and the projection 205 comes into contact with it. As the parts are being partially driven and also have a certain amount of momentum and as the housing of the pin 173 is free to move to a certain extent in the slot 175 the projection 205 carries round with it for a short distance the projection 176. This causes the arm 171 to rotate the post 170 which in turn causes the forked collar 167 to pull upon the sleeve 159 and pull the particular wheel 163 or 164 out of gear from the pinion 177 and thus stop the drive of the particular unit without however it will be seen stopping the drive of the main shaft 157 which it should be stated is driving a similar mechanism for each unit. Now the required letter or the like is being exhibited by the unit and in order to exhibit a fresh letter it is simply necessary to send the required number of impulses to set the hump 188 in the new position and to energize either the magnet in connection with the rod 202 or the magnet in connection with the rod 203 by means for example of a perforated tape such as that shown at Fig. 8, where the "forward" and "reverse" perforations are adapted for this purpose, or by other suitable means. This action throws into gear either the wheel 163 or 164 when the cycle of operations, previously described is repeated.

The mechanism just described may as far as possible be located within an upstanding wall or under-cut portion of one of the hollow rollers for the band so that as far as possible all the working parts are protected and contained in the roller, thus making a compact apparatus. 206 is an arm pivoted at 207 and kept pulled upward by means of a spring 208. This arm is provided in the neighborhood of the pin 173 with three notches so that the arm 174 can be held in these three definite positions, that is first with the wheel 163 in gear with the pinion 177, 2nd with neither of the wheels 163 or 164 in gear with the pinion, 177 or 3rd with the wheel 164 in gear with the pinion 177.

Referring now to Figs. 17 to 21 in these figures as shown in fairly full detail a method of controlling the sequence of operations, especially in connection with the switching into circuit of the various units and the methods of driving the units at the required times, as well as additional means, which is not in all cases necessary, for lowering and raising an obscuring blind in its proper sequence so that the announcement being exhibited may be changed to another announcement behind the obscuring blind without the changing being visible and only a completed announcement being shown.

Generally the device about to be described consists in two electric motors combined with various movements and electrical timing devices for causing the motors to run first in one direction and then in the opposite direction to carry out their purposes.

209 is the main motor which has mounted on its shaft a worm 210, gearing with a worm wheel 211, mounted upon a shaft 212. The shaft 212 is mounted in suitable bearing brackets and has connected to the end thereof a pinion 213 which gears with a toothed wheel mounted upon the driving shaft of the first unit. The shaft 212 also causes the toothed wheel 214 to be rotated in the required direction through suitable intermediate gearing. The spindle upon which the wheel 214 is mounted passes through the framework 215 and has mounted upon the other side thereof a cam member 216. This cam is furnished with two projecting portions which engage with the teeth of a large toothed wheel 217. The wheel 217 has projecting from the side thereof a short arm 218 carrying a projecting pin 219. The projecting pin 219 is adapted to come into contact with another projection 220 carried by the arm 221 of a lever pivoted at 222 to a bracket 223 attached to the casing. The other end of this lever works between the stops 224 and 225 and is slotted at 226 and has located in the said slot a pin 227 mounted on the end of the arm 228, which works around a suitable stud or the like projecting from the casing. The arm 228 has connected thereto an insulated block 229 which carries two pairs of laminated brushes 230 and 231. These laminated brushes work over metallic segments 232, 233, 234, 235, the whole constituting a reversing switch connected up in the manner hereinafter to be described. Between the segments 235 and 232 another small segment 236 is located and between the segments 235 and 233 another segment 237 is located.

It should here be explained that when the brushes 230 and 231 are in one extreme position the connections are in position for causing the main motor to run in one direction while when they are in another extreme position the connections are so arranged that the motor runs in the opposite direction.

Mounted upon the face of the wheel 217 and insulated therefrom is a metal plate 238, cut away at one portion and provided with a segment of insulating metal. 239, 240 and 241 are spring contacts normally pressing upon the metal plate 238, which when the insulated portion 239 comes around, causes the contact 241 to be out of circuit with the contact 240. The wheel 217 also carries a projecting metallic contact 242 adapted to coöperate with an inwardly projecting contact making pin 243 arranged upon a spring arm 244, the pin coming in such a position that when the wheel 217 rotates in a clockwise direction the curve of the insulating block on the under part of the metallic contact 242 causes the pin 243 to ride under the insulating block and not to make an electric contact; while when the wheel 217 rotates in a counter clockwise direction, the curved metallic front of the contact 242 causes the pin 243 to ride up the incline and make electric contact. 245 are curved spring fingers for short circuiting the contacts 240 and 241 when required. The spring fingers 245 are secured to and insulated from the arm 221. Mounted behind the toothed wheel 217 so as to turn therewith is another plate 246 provided with teeth 247 at some portions of its periphery but having a plain portion 248. 249 is a roller mounted at the end of an arm 250 in turn pivoted upon one arm 251 of a lever 252 pivoted to the casing. The roller 249 projects into the path of the teeth 247 and when the said teeth approach it, moving in a clockwise direction with reference to Fig. 17, the roller merely rides up over the teeth against the action of its spring, without moving the arm 251, but when the teeth approach it moving in a counter-clockwise direction the roller causes its arm 250 to bear upon a projecting pin and to force the arm outward. This causes the other arm of the pivoted lever 252, namely the arm 253, to move inward and as this arm of the lever carries a spring controlled pawl 254 it causes the nose of said pawl to come into contact with the teeth of a light spring controlled escapement wheel 255. This spring controlled escapement wheel works partially beneath a curved insulating block 256 provided with a number of metal contacts 257 insulated from each other. Each of these metallic contacts, is, however, connected to one of the units or to a particular electro-magnet or group of magnets in connection with the units. The wheel 255 carries a contact making brush 258 pivoted at 259 upon the hub thereof and suitably insulated from the other parts.

The brush 258 works over and makes contact with the metallic contacts 257 and is adapted to stop at any one of the said contacts. Beneath the brush 258 another brush or contact making device 260 is provided, which also moves with the wheel 255. This contact making device 260 is adapted to connect two contact points 261, 262 together (see Figs. 17 and 22). 263 is an electromagnet the armature of which controls an escapement 264, which releases the wheel 255 through one tooth, each time an impulse passes around the said electro-magnet. This action causes the contact making device 258 to switch in a fresh unit and is similar to the selective switches described with reference to Figs. 6 to 8. When the last contact is reached the points 261 and 262 are connected which causes the small auxiliary motor to start in the manner hereinafter explained. When the small auxiliary blind motor is not required, the contacts 261 and 262 and the arm 260 may be employed to start the main motor directly through an electro-magnet switch. 265 is a rod connected at one end to the arm 221 and at the other end to a lever 266. This lever 266 is mounted upon a spindle 267 extending through the casing and carrying a reversing drum 268 upon which presses four spring brushes 269, 270, 271, 272. 273 is a small motor, which is in this case combined with the mechanism so as to raise and lower the obscuring blind when desired, but the same principle could be applied for the setting of pictures or the control of any desired movements in some of the different combinations that could be constructed under these inventions. The field of this motor has connected thereto an electro-magnet 274 which controls a brake band 275 mounted around the drum $a$ on the the shaft of the motor so that when the motor is running the armature of the electromagnet 274 is attracted and no braking action is necessitated, but when the field is not excited the armature is not attracted and the brake comes into action. This is provided so as to pull up the motor quickly when the current is switched off, and it should be here remarked that if found necessary a similar braking magnet might be used in combination with the motor 209. The ends of the brake band 275 are provided with apertures through which the pillar $b$ passes. The lower end of the band is secured upon the pillar $b$ by a nut $c$ and upon the pillar above the other end of the brake band is a sliding sleeve $d$, which is engaged by the forked end of the armature lever 274$^a$. On the pillar between the sleeve $d$ and the nut $c$ is the compression spring $f$. It will be seen that the spring normally holds the band drawn into firm engagement with the drum, thereby locking the whole movement. When the current is switched onto the motor, the armature of the magnet 274 swings the lever 274$^a$, thereby lifting the sleeve $d$ and releasing the brake. 276 is a worm mounted upon the motor shaft gearing with a worm wheel 277 mounted upon an inclined axis 278. This inclined axis has also mounted thereon a small pinion 279, which gears with a large toothed wheel 280 formed at the bottom of a disk 281, of insulating material. Upon the face of the disk 281 a metallic ring 282 is located together with another almost complete metallic ring 283, the rings 282 and 283 being connected together. Toward the center a contact making device 284 is provided, the ends of which are curved and at different distances from the center of rotation, so that when turning in one direction the outer face makes metallic contact with the contact making arm 285, while when turning in the other direction the contact making arm 285 is caught on the inside which is of insulated material and, therefore, does not make any electrical contact. 286 is another disk of insulating material carrying at the top a contact making device 287, adapted to make contact with a contact-making arm 288, and when running in the opposite direction not to make metallic contact therewith. Both the metallic contacts 284 and 287 are connected as indicated by the dotted lines in Fig. 22 to the metallic ring 282.

Assuming the other parts are in the position shown at Fig. 17 and that the escapement 264 has been actuated a sufficient number of times to bring the brush 260, (see Fig. 19) over the contacts 261 and 262, the small motor 273 is started by the current being completed therethrough as will be seen from Fig. 22. Here starting at the top of the contact 262 the current flows to the arm 288 from the metallic plate 287, through the dotted line to the outer ring 282, thence by the contact making arm 289, down to the positive line, up the negative line to the brush 272 on the small reversing switch 268, across the dotted connection to the brush 269, thence through the armature to the motor 273, through the brush 271 to the brush 270, thence to the field of the motor and through the windings of the electro-magnet 274, then back to the line and on to the contact 261. As the motor starts, the toothed wheel 280 is caused to turn the disk 281. This causes the metallic ring 283 to come into contact with the contact making arm 290, and when this is accomplished the contact 288 leaves the contact making plate 287. Now it will be seen that the circuit is completed through the small motor by passing from the contact 289 to the ring 282 thence to the ring 283, back to the contact 290. This action has the effect of lowering the obscuring blind in front of all the units, by a suitable arrangement of gearing to the toothed bevel wheel 291 mounted upon the spindle 278. As shown in Figs. 17, 18 and 19, the bevel wheel 291 meshes with a bevel wheel 291ᵃ on the roller 291ᵇ mounted in the frame X and carrying the obscuring blind z. It is to be understood that the units are to be placed side by side and that an obscuring blind z may be used for all the units or several blinds may be employed. Now when the motor 273 is set in operation, it causes the blind to be lowered and when the blind is lowered the motor is stopped leaving the units hidden. Upon operating the motor in the opposite direction, the blind is wound up and the units exposed. All the bends which are in position showing their previous settings are free to be returned to zero, and in order to accomplish this the main motor starts by the arm 285 coming into contact with the contacts 284. This completes the circuit through the main motor as will be seen from Fig. 22, where starting from one side of the main motor 209, say from the top brush, the line passes down to the segment 234. It then passes by means of the laminated contact making brush 231 to the segment 233 and so on to the negative line, passes up the positive line through the outer connection to the contact 289, thence to the ring 282 across the dotted connection to the contact making device 284, which has now come into circuit (it having previously been resting with its non-conducting side against the contact), thence down the contact arm 285 to the field of the motor 209 and from thence to the segment 232, through the laminated brush 230 to the segment 235, from thence to the other brush of the motor 209 thus completing the circuit.

By this time the small motor has stopped owing to the metallic ring 283 having left the brush 290 and it should here be observed that the gear is so arranged that the disk 281 only makes a single revolution. The main motor continues to run until all the bands are set back to zero, when it automatically reverses itself in the following way:—

Taking the position from Fig. 17, the cam 216 has been rotating in a counter-clockwise direction, this has caused the wheel 217 to turn in a clockwise direction and has brought the pin or projection 219 around so that it comes beneath the projection 220. The wheel continuing to rotate the pin 219 bears beneath the pin 220 and rocks the arm 221 upward. This causes the other arm of the lever to move downward and take with it the arm 228 and reverse the connections of the main reversing switch, that is it causes the laminated brush 231 to connect the segments 235 and 233 together and the laminated brush 231 to connect the segments 234 and 232 together, resistances 292 being interposed as seen at Fig. 22 to prevent any possible burning out of the armature.

It will be seen that the direction of the motor will, therefore, be reversed and all the bands will be wound forward according to the setting of their selectors, when each will be automatically thrown out. When all the bands are set in their new position the gearing is so arranged that the metallic contact 242 comes into contact with the pin 243. This again starts the small motor 273, but as the reversing switch 268 has been operated by means of the arm 265 being pulled down, this motor also runs in the opposite direction to the direction in which it previously ran, and consequently winds up the blind, thus exhibiting a fresh advertisement.

It should be here observed that as soon as the main motor started running, the contact 241, which had been previously on the insulated portion 239, was brought into contact with the metallic plate 238, as this commenced to rotate. This shortened the circuit of the main motor as follows:—

The current coming from the positive line passes to the contact making brush 240, thence to the brush 241, through the metallic plate 238, and from thence up to the field of the motor 209, from the other side of the field to the segment 232, thence to the segment 235 to the lower brush of the motor, from the upper brush of the motor to the segment 234, thence to the segment 233, back to the negative line.

When the wheel 217 causes the arm 221 to be rocked upward the insulated portion 239 is again brought around, thus cutting out the brush 241, but the spring connecting arms 245 in their downward action connect the brushes 240 and 241 together, thus allowing the reversing action to take place until the metallic plate again comes into contact with the brushes 240 and 241.

While the bands have been setting in the new exhibiting position the wheel 217 has been turned in a counter-clockwise direction, bringing it into the position shown at Fig. 17 with the pin 219 engaging upon the upper surface of the pin 220. This has had the effect of again bringing the parts into the position shown in the figure and stopping both motors.

During this latter action the teeth 247 have caused the pawl 254 to set the wheel 255 back into its original position, that is with the brush in contact with the first metallic contact 257.

At the position adjacent the cam 216 where the wheel 217 stops in either direction the teeth are made so that they can spring in as shown at 293, Fig. 17, in this way should the momentum of the large motor cause the cam to engage with the wheel 217, although this wheel is prevented from rotation, the teeth will not be broken off, but will spring up against the action of the springs.

What I claim as my invention and desire to secure by Letters Patent of the United States of America is:—

1. In an advertising device having a series of elements each provided with advertising carrying members, means for controlling the position of the advertising members of each element, and means for operating the controlling means to move it through a unit distance or through a multiple of unit distance by a single impulse in each case.

2. In an advertising device having a series of elements, each provided with advertising carrying members, a selector for determining the positions of the advertising members of each element, and electrical means for operating the selector to move it a unit distance or through a multiple of unit distance by a single impulse in each case, the impulse for operating the selector for unit distance being different from that operating it for a multiple of unit distance.

3. In an advertising device, a plurality of elements each provided with advertising carrying members, a selector for determining the positions of the advertising members of each element, said selector having two ratchet wheels, and electrically operated means for operating the ratchet wheels by a single impulse to move one through unit distance and the other through a multiple of unit distance, the impulses for operating the said wheels being different.

4. In a device for making public announcements, exhibiting advertisements and for other purposes of a like nature, having a plurality of elements each provided with advertising carrying members, a selecting device for determining the positions of the advertising members, ratchet wheels and spring-controlled escapements for setting the selecting device in the required position, and means for allowing the ratchet wheels to move through unit distance or a multiple of unit distance, such means consisting of magnets of the character described, and means for causing the current to be transmitted to the electro-magnets for the purposes set forth.

5. In an advertising device having a series of elements each provided with advertising carrying members, means for controlling the position of the advertising members of each element, and electrical means for operating the controlling means in such manner whereby one single impulse moves the controlled part through a unit distance, and another single impulse moves such controlled part through more than a unit distance, at one time.

6. In an advertising device, a plurality of elements provided with advertising carrying members, and a selector for determining the position of the advertising members of the elements, said selector comprising two ratchet wheels having different number of teeth, electrically operated pivoted and spring pressed levers, and pawls carried by the levers and engaging the ratchet wheels.

7. In an advertising device, a plurality of elements provided with advertising carrying members and a selector for determining the position of the advertising members of the elements, said selector comprising two ratchet wheels having different number of teeth, electrically operated pivoted and spring pressed levers, and pawls carried by the levers and engaging the ratchet wheels, the said levers being provided with members for engaging the ratchet wheels to prevent them from moving more than one tooth at a time.

8. In an advertising device, a plurality of elements provided with advertising carrying members, and a selector for determining the position of the advertising members of the elements, said selector comprising ratchet wheels having different number of teeth, pivoted and spring pressed levers, pawls carried by the levers and engaging the ratchet wheels, electrical means for operating each lever, and means for preventing the device from becoming locked when weak and strong currents are employed.

In testimony whereof, I affix my signature in presence of two witnesses.

HENRY KINGSFORD HARRIS.

Witnesses:
LILY SIMMONDS,
A. E. VIDAL.

Copies of this patent may be obtained for five cents each, by addressing the "Commissioner of Patents, Washington, D. C."